United States Patent [19]

Wax et al.

[11] Patent Number: 5,128,291
[45] Date of Patent: Jul. 7, 1992

[54] POROUS TITANIA OR ZIRCONIA SPHERES

[76] Inventors: Michael J. Wax, 5515 Northfield Rd., Bethesda, Md. 20817; Robert K. Grasselli, 12 Black Rock Rd., Chadds Ford, Pa. 19317

[21] Appl. No.: 626,599

[22] Filed: Dec. 11, 1990

[51] Int. Cl.[5] .................. B01J 21/06; B01J 35/08
[52] U.S. Cl. ........................... 502/8; 502/60; 502/217; 502/242; 502/308; 502/309; 502/325; 502/339; 502/349; 502/350; 210/198.2; 210/502.1; 210/656
[58] Field of Search ............... 502/8, 9, 439, 527, 502/60, 242, 217, 308, 309, 325, 339, 349, 350; 210/198.2

[56] References Cited

U.S. PATENT DOCUMENTS

| | | | |
|---|---|---|---|
| 3,782,075 | 1/1974 | Kirkland | 55/67 |
| 3,855,172 | 12/1974 | Iler et al. | 260/39 R |
| 3,892,580 | 7/1975 | Messing | 106/41 |
| 4,010,242 | 3/1977 | Iler et al. | 423/335 |
| 4,048,112 | 9/1977 | Matsushita et al. | 502/350 |
| 4,140,654 | 2/1979 | Yoshioka et al. | 502/527 X |
| 4,245,005 | 1/1981 | Regnier et al. | 428/420 |
| 4,677,084 | 6/1987 | Bergna | 502/8 |
| 4,948,773 | 8/1990 | Ito | 502/527 X |

OTHER PUBLICATIONS

Edward A. Pfannkoch, Barbara S. Switzer and William Kopachiewicz "Aluminum Ion Mediated Stabilization of Silica-Based Anonion-Exchange Packings to Caustic Regenerants", Journal of Chromatography, 503, (1990), 385-401.

R. M. Chicz, Z. Shi and F. E. Regnier "Preparation and Evaluation of Inorganic Anion-Exchange Sorbents Not Based on Silica", Journal of Chromatography, 359 (1986) 121-130.

*Primary Examiner*—W. J. Shine
*Attorney, Agent, or Firm*—Edward J. Cabic

[57] ABSTRACT

Porous titania or zirconia spheres having a particle diameter of about 1 to 100 microns, a pore volume of about 0.1 to 1 cc/g, and a pore diameter in the range of about 10 to 5,000 Angstrom units are made by spray drying a slurry of ultimate titania or zirconia particles having a diameter about equal to that of the desired pore diameter of the formed sphere, and a reactive binder. The spheres can be used in high performance liquid chromatography columns and as catalyst supports.

31 Claims, No Drawings

POROUS TITANIA OR ZIRCONIA SPHERES

BACKGROUND OF THE INVENTION

1. Field of the Invention

This invention relates to microporous titanias and zirconias and a method of making these materials.

2. Description of the Previously Published Art

Many liquid chromatographic packings are formed of silica, either alone or with some coating or surface treatment. Silica has good physical strength, and may be formed into a variety of particle shapes and sizes with a variety of pore diameters, porosities, and surface areas. However, silica has the disadvantage that it is readily soluble in basic media. This flaw precludes the use of silica-based packings in applications where the chromatography itself or some customary washing of the chromatographic material requires the use of a base.

Several materials have superior base-resistance to silica. Titania, or titanium dioxide, is a superb choice from among these, being insoluble in most acidic or basic solutions, as well as being non-toxic and not being very expensive. Although titania has been described as a liquid chromatographic support, it suffers in this regard because it is difficult to produce porous titania bodies which have the combination of physical integrity and sufficient porosity and surface area for use in liquid chromatography.

Physical integrity is a concern with respect to chromatographic media for two reasons. First, high flow rates in high-performance liquid chromatography (HPLC) columns result in high backpressures, which may reach 10,000 psi in some cases. Useful supports must resist deformation caused either directly by liquid flow or by the backpressure. Second, in order to assure good stability of the packed column under flow conditions, and to keep void volume low, vigorous column packing methods are used. For example, the slurry packing method, as set forth by Pfannkoch, Switzer, and Kopaciewicz (*Journal of Chromatography*, 1990, 503, 385–401), requires that the packing be forced into the column as a slurry with pressure bursts of about 5,000 psi. During the packing procedure, both attrition and crushing of packing particles may occur. Thus, these particles must have both physical strength and attrition resistance.

Porous titanias may be produced through the agglomeration of smaller, non-porous particles ("ultimate particles"). When the ultimate particles are agglomerated, the spaces between them become pores, and their surfaces provide surface area to the final body. Some of the surface area and pore volume will be lost where the ultimate particles are fused. The practical difficulty in the agglomeration process is providing sufficient attachment between the ultimate particles to impart the desired strength to the porous body, while maintaining suitable pore volume and surface area. Strong, but non-porous, and porous, but weak, titania bodies are easily formed.

U.S. Pat. Nos. 3,855,172 and 4,010,242 disclose porous microspheres of refractory oxides, including titania, and a method for their preparation. Colloidal particles of the oxide are trapped in a polymerizing mixture of formaldehyde and urea or melamine. Upon polymerization, microspheres are formed, from which the polymers may be removed by calcination to produce pores. However, according to Example 10 of both patents, when this technique is applied to titania, only solid non-porous particles with surface area less than one square meter per gram are formed. U.S. Pat. No. 3,782,075 also discloses porous oxide microspheres for use in chromatography, but refers to the above-mentioned method of U.S. Pat. No. 3,855,172 for their manufacture.

U.S. Pat. No. 4,245,005 teaches the use of porous oxide supports with polymeric coatings in liquid chromatography. The claims in this patent are directed to the polymeric coating, which is formed from polyethyleneimine cross-linked with diepoxides. Although titania supports are discussed, no mention is made of their preparation. Similar information is disclosed in an article entitled "Preparation and Evaluation of Inorganic Anion Exchange Sorbents Not Based on Silica", published in the Journal of Chromatography, volume 359, pages 121–130, in 1986. However, no reference to the method of preparation of suitable porous titania is given, and the titania mentioned is of a particle size too large to be suitable for HPLC.

U.S. Pat. No. 3,892,580 discloses inorganic bodies which have a high surface area due to inherent high porosity. These materials are useful as catalyst supports, filter media and as carriers in chromatographic columns. The primary object in this patent is to provide a method for making porous bodies of alumina, titania, zirconia and silica. The pore diameters of these bodies will range from about 100 Angstroms to 1,000 Angstroms. These porous bodies are made by mixing a liquid binder solution with a colloidal suspension of the inorganic oxide to yield a mixture of uniform consistency. This mixture is then dried and fired at a temperature below the sintering temperature of the inorganic oxide. It is disclosed in column 3 of this reference that the liquid binder that is employed should not dissolve or substantially erode the inorganic oxide particles since they will then no longer permit the achievement of a controlled pore dimension. This is the function of the initial particle size of the particles. In this regard it is stated that this essentially eliminates the common mineral acids such as hydrofluoric acid, hydrochloric acids, sulfuric acid, nitric acid and the like from consideration. However, it was found that certain organic acids and organic acid salts had the utility to be good binders. These acids and acid salts include acetic acid, propionic acid, sodium acetate, magnesium acetate, and zinc acetate. The method of producing the inorganic oxide bodies consist of forming a slurry of the particles and the binder and then drying this slurry at a temperature of about 90° C. to 100° C. During the drying step the bodies of the inorganic material are formed. These bodies are then fired at an elevated temperature to develop the chemical bonds. In the process of this patent the strength of the body and of the formation of the oxide bonds are the result of the firing step rather than one of the prior steps of the process.

3. Objects of the Invention

It is an object of this invention to obtain porous titania and zirconia microspheres.

It is further object of this invention to obtain porous monodisperse titania and zirconia microspheres.

It is further object of this invention to obtain porous monodisperse titania and zirconia microspheres with both good porosity and physical strength.

It is further object of this invention to produce porous titania and zirconia supports which are suitable for use in high-performance liquid chromatography.

It is further object of this invention to provide titania supported catalysts.

It is further object of this invention to provide a zirconia supported catalysts.

These and further objects will become apparent as the description of the invention proceeds.

SUMMARY OF THE INVENTION

Titania and zirconia bodies are produced which are porous, yet mechanically strong. The spheres have a particle diameter of about 1 to 100 microns, a pore volume of about 0.1 to 1 cc/g, and a pore diameter in the range of about 10 to 5,000 Angstrom units. A mixture is formed of a titania or zirconia sol made of particles having a diameter about equal to that of the desired pore diameter of the final sphere and a binder such as titanyl sulfate or other reactive material, and this mixture is spray dried to produce porous spheres. The spheres are calcined to produce hard bodies which can withstand the high flows and pressures used in high-performance liquid chromatography.

Although the exact mechanism of how the reactive binder works is not known, it is believed the preferred titanyl sulfate decomposes on spray drying to form a hydrous oxide which cements the titania and zirconia sol particles together. Other reactive binders, such as silicic acid and zirconyl sulfate, also may be used.

In addition to their utility as a high performance liquid chromatography packing, the spheres may be used as catalyst supports.

DESCRIPTION OF THE PREFERRED EMBODIMENTS

According to the current invention, a titania or zirconia sol containing a reactive binder is spray dried to produce porous titania or zirconia spheres. Variables of this process include the size of the titania or zirconia particles in the sol, the concentrations of these particles, the nature and concentration of the binder, the spray drying conditions, and any additional treatments of the spheres prior to use. These variable components are discussed below.

The particles of the titania sol or zirconia sol may be any desired size and shape. Preferably, however, these will be spherical, to produce maximum porosity, and have a diameter approximately the desired pore diameter of the finished body. For use in liquid chromatography, the desired pore diameter will be a function of the size of the molecules being analyzed. This diameter should be large enough to allow relatively unimpeded diffusion of the molecules into the pores, but not so large that the surface area, and hence capacity, becomes too small. If a bimodal pore size distribution is desired, a sol containing particles of two different sizes may be used. Preferred diameters range from 10 to 5,000 Angstrom units, and more preferably from 50 to 2,000 Angstrom units.

Sources of titania sols will depend upon the desired particle sizes. Commercial samples in the 100–200 Angstrom units range are available. Larger sol particle sizes may be prepared by the controlled, alcohol-phase hydrolysis of titanium alkoxides.

Zirconia sols may be prepared by the hydrolysis of zirconium alkoxides or through other means.

Any of a variety of reactive binders may be used, with the proviso that the binder chosen gives particles with good physical integrity. The binder can be a soluble compound of titanium, zirconium silicon or aluminum. The binder should be a soluble compound of a metal or metalloid which decomposes during the spray drying process to form an insoluble compound of the metal or metalloid. Titanyl sulfate appears to be a particularly suitable binder. While not wishing to be bound by any particular theory, we believe that titanyl sulfate may decompose on spray drying to form a hydrous oxide of titania. This hydrous oxide would serve to cement the sol particles together, and further should show the good acid and base stability associated with titanium oxide. Zirconyl sulfate operates in a similar manner. Silicic acid, which might decompose to form silica or some hydrate thereof on spray drying, also is a useful binder as is the oligomer or polymer thereof.

The amount of binder which may be used is dependent upon the amount of titania or zirconia which is present. If too little binder is added, the porous particles will not have the requisite physical integrity. Conversely, if too much binder is added, the particles will not be porous, as all of the pores will be filled by binder. For the titania-titanyl sulfate system, the ratio of titania to binder preferably is in the range of 2–100:1, and more preferably in the range of 10–30:1. Thus, given a titania concentration of 20%, a titanyl sulfate concentration of 1% is particularly suitable. Of course, this ratio will depend upon the nature of the binder, and also may depend upon other factors, such as pH and spray drying time and temperature. The amount of titania or zirconia present may vary over a wide range, concentrations ranging from 1 to 50% being suitable.

The spray drying conditions cannot be precisely stated, as they will vary with the equipment being used. It will be important to maintain a temperature sufficiently high for drying to occur, preferably above 50° C. Further, the nozzle used should produce droplets on the order of the sphere size desired. Within the confines established by these requirements, however, a wide variety of conditions should suffice to produce material with the desired properties.

After having been produced by spray drying, the porous titania or zirconia spheres are suitable for use. However, additional treatments also may be carried out. These include calcination, washing, and de-fining. Calcination at temperatures ranging from 150° to 900° C. may be used, with heating rates ranging from 0.1 to 20° C./minute and soak times ranging from 0 to 10 hours. The higher temperatures and longer times in these ranges are useful for removing sulfur from the porous spheres, if said removal is desired. The spray dried particles are calcined to obtain stronger particles.

Similarly, washing with aqueous acidic, basic, or neutral solutions, prior to, subsequent to, or independent of a calcination step may be performed as desired. A wash using 1M sodium hydroxide, for example, has been found to be useful prior to a defining step by enhancing settling from alcohol suspensions.

De-fining is a useful step in preparing the titania or zirconia spheres prior to use. What is meant by de-fining is removal of fines, specifically those particles with diameters less than about half the mean particle diameter. Such fines are produced in the spray drying process, and tend to fill the interstices between larger particles, thus plugging chromatographic columns. Any effective method of de-fining may be used. In practice, repeatedly shaking the porous titania or zirconia in water, alcohol, or other liquid, allowing the larger particles to settle, and decanting the supernatant is useful on a laboratory scale.

Porous titania and zirconia spheres having a range of properties may be produced using the above preparation method. The precise choice of properties will depend upon the specific application. Particle diameter may range from about 1 to 100 microns, and more preferably will range from about 2 to 25 microns, and most preferably about 4 to 15 microns. Pore diameter may range from about 10 to 5,000 Angstrom units, and more preferably will range from about 50 to 2,000 Angstrom units, and most preferably, about 100 to 1,500 Angstrom units. Porosity should fall in the range from about 0.1 to 1 cc/g. Surface area will be a function of the pore diameter and porosity, and so cannot be stated precisely.

Use of the spherical porous titania or zirconia as a liquid chromatographic packing places additional demands on its properties. Particle strength must be sufficiently high to withstand the static pressures generated by the high flows used in high-performance liquid chromatography, as well as the stresses of column packing. This strength is defined in terms of the ability to survive a slurry packing process, as described above. The particle size distribution must be narrow to avoid column plugging. Preferably, 50% of the porous bodies will have diameters within 50% of the average diameter; more preferably, 75% will have diameter within 25% of the average diameter.

The titania or zirconia of the current invention may be used without further treatment for so-called normal phase liquid chromatography. Alternatively, it may be subject to the appropriate treatment to prepare it for use in some other form of chromatography, e.g. reversed phase or ion exchange. For example, a pellicular coating such as that disclosed in U.S. Pat. No. 4,245,005 may be applied to the titania or zirconia. This coating is formed by first absorbing polyethyleneimine onto the titania or zirconia, then cross-linking said polymer with a diepoxide, such as butanediol diglycidyl ether ("BUDGE") to prevent its loss from the titania or zirconia surface.

The titania or zirconia spheres of the present invention also make good catalyst supports, as they are chemically resistant and strong. Catalyst may be supported on the spheres in a post-impregnation step, in a manner known to those skilled in the art. Alternatively, soluble metal salts may be added to the slurry to be spray dried. These salts will decompose during the spray drying, or in a subsequent calcination, if necessary, to give supported heterogeneous catalysts. Finally, insoluble catalyst particles may be added to the slurry, and these will be incorporated into the spray dried spheres. This last method will be particularly useful in the case of zeolite catalysts, which must be pre-formed in a separate crystallization step. While not inclusive, a list of suitable non-zeolite catalysts includes the noble metals (e.g., rhodium, iridium, palladium, and platinum) for hydrocarbon conversion and automotive exhaust applications, and vanadium and tungsten oxides for stationery emission control applications.

Having described the basic aspects of our invention, the following examples are given to illustrate specific embodiments thereof.

EXAMPLE 1

A sol containing 10 wt % titania (approximate particle diameter 2,000 Angstrom units; prepared by hydrolyzing titanium ethoxide in ethanol) and 1 wt % titanyl sulfate was spray dried using a Yamamoto Pulvis Basic Unit Model GB-21 spray dryer. The material collected from the dryer was calcined at 500° C. prior to removal of fines by settling in methanol. The particles obtained had a mean diameter of 5.5 microns as measured with a Coulter Counter, and a BET surface area of 18 $m^2/g$, a pore volume of 0.2 cc/g in the 600–4,000 Angstrom units range as measured by mercury porosimetry, and an average pore diameter of 2,400 Angstrom units measured by mercury porosimetry. Examination by scanning electron microscopy showed these particles to be spherical.

In order to demonstrate the suitability of the titania spheres for HPLC, they were packed into a 5×0.41 cm stainless steel column. A flow of 50% (w/w) isopropanol/water at 7.8 ml/min generated a 7,500 psi pressure drop in the column without bed collapse.

EXAMPLE 2

The procedure of Example 1 was followed, but with a sol containing 20 wt % titania. The titania microspheres had a mean diameter of 5.8 microns, a surface area of 19 $m^2/g$, a pore volume of 0.22 cc/g, and an average pore diameter measured in the range of 600–4,000 Angstrom units of 2,100 Angstrom units.

The physical strength of these microspheres was verified by subjecting them to the slurry packing procedure discussed above. No fines were generated during this procedure. A 5×0.41 cm column packed using this method showed negligible pressure drop at a flow rate of 1 ml/min (water), indicating that the microspheres remained intact.

EXAMPLE 3

The procedure of Example 1 was followed, but with a sol containing 20 wt % titania. The titania microspheres had an average particle diameter of about 1,000 Angstroms. The ultimate titania particles had been prepared by hydrolyzing titanium isopropoxide in ethanol. The microspheres obtained had a surface area of 37 $m^2/g$, a pore Volume of 0.34 ml/g, and a mean pore diameter of 1,200 Angstrom units when measured in the range of 600–2,000 Angstrom units.

EXAMPLE 4

This example shows that chromatographic performance is possible using the titania microspheres of the current invention.

Titania spheres prepared according to Example 1 were coated with polyethyleneimine using the method of Regnier, as set forth in the Journal of Chromatography, Volume 359, pages 121-130, in 1976. These were packed into a 5×0.41 cm stainless steel column and used for the chromatographic separation of bovine serum albumin and ovalbumin described by Regnier. Resolution of the two proteins was obtained under normal chromatographic conditions.

It is understood that the foregoing detailed description is given merely by way of illustration and that many variations may be made therein without departing from the spirit of this invention.

What is claimed is:

1. Porous titania or zirconia spheres having a particle diameter of about 1 to 100 microns, a pore volume of about 0.1 to 1 cc/g, and a pore diameter in the range of about 10 to 5,000 Angstrom units, which have been formed by spray drying a slurry of
   a) ultimate titania or zirconia particles having a diameter about equal to that of the desired pore diameter of the formed sphere, and b) a reactive binder, said binder being a soluble compound of a metal or metalloid which decomposes during the spray drying process to form an insoluble compound of the metal or metalloid.

2. A composition according to claim 1, wherein the diameter of the spheres is about 2 to 25 microns.

3. A composition according to claim 2, wherein the diameter of the spheres is about 4 to 15 microns.

4. A composition according to claim 1, wherein the diameter of the pores is about 50 to 2,000 Angstrom units.

5. A composition according to claim 4, wherein the diameter of the pores is about 100 to 1,500 Angstrom units.

6. A composition according to claim 1, wherein 50% of the particle diameters are within 50% of the average diameter.

7. A composition according to claim 6, wherein 75% of the particle diameters are within 25% of the average diameter.

8. A composition according to claim 1, wherein the binder is a soluble compound of titanium, zirconium, silicon or aluminum.

9. A composition according to claim 8, wherein the binder is titanyl sulfate or zirconyl sulfate.

10. A method to make porous titania or zirconia spheres having a particle diameter of about 1 to 100 microns comprising
   a) forming a slurry of
      i) ultimate titania or zirconia particles having a diameter from about 10 to 5,000 Angstrom units, and
      ii) a reactive binder, said binder being a soluble compound of a metal or metalloid and
   b) spray drying the slurry to form porous titania or zirconia spheres in which said compound of a metal or metalloid decomposes during the spray drying process to form an insoluble compound of the metal or metalloid.

11. A method according to claim 10, wherein the fines are removed by settling.

12. A method according to claim 10, wherein the spray dried particles are calcined to obtain stronger particles.

13. A method according to claim 10, wherein the titania or zirconia particles are prepared by hydrolyzing a titanium or zirconium alkoxide in an alcohol.

14. A method according to claim 10, wherein the reactive binder is titanyl sulfate.

15. A method according to claim 10, wherein the diameter of the spheres is about 2 to 25 microns.

16. A method according to claim 10, wherein the ultimate titania particles have a diameter of about 50 to 2,000 Angstrom units.

17. A method according to claim 10, wherein 50% of the particle diameters are within 50% of the average diameter.

18. A method according to claim 12, wherein the binder is a soluble compound of titanium, zirconium, silicon or aluminum.

19. A method according to claim 18, wherein the binder is titanyl sulfate or zirconyl sulfate.

20. A hydrocarbon conversion catalyst comprising a porous titania or zirconia sphere according to claim 1, further comprising a catalytically effective amount of a hydrocarbon conversion catalytic metal and/or metal oxide.

21. A hydrocarbon conversion catalyst according to claim 20, wherein the catalytic metal is added to the the formed porous titania or zirconia sphere.

22. A hydrocarbon conversion catalyst according to claim 20, wherein the catalytic metal is added to the slurry prior to spray drying to form the spheres.

23. A hydrocarbon conversion catalyst according to claim 22, wherein the catalytic metal is added as a soluble catalyst metal precursor salt.

24. A hydrocarbon conversion catalyst according to claim 22, wherein the catalytic metal is added as solid particles.

25. A hydrocarbon conversion catalyst according to claim 20, wherein the metal is selected from the group consisting of palladium, platinum, rhodium, and iridium.

26. A hydrocarbon conversion catalyst comprising a porous titania or zirconia sphere according to claim 1, further comprising a catalytically effective amount of a zeolite which has been added to the slurry prior to spray drying.

27. An emission control catalyst comprising a porous titania or zirconia sphere according to claim 1 further comprising a catalytically effective amount of an emission control catalytic metal or metal-containing compound.

28. An emission control catalyst according to claim 27, wherein the catalytic metal or metal-containing compound is added to the formed porous titania or zirconia sphere.

29. An emission control catalyst according to claim 27, wherein the catalytic metal or metal-containing compound is added to the slurry prior to spray drying to form the spheres.

30. An emission control catalyst according to claim 29, wherein the catalytic metal or metal-containing compound is added as a soluble catalyst metal precursor salt or as solid particles.

31. An emission control catalyst according to claim 27, wherein the metal is at least one of vanadium, tungsten, platinum, palladium, rhodium, or iridium.

* * * * *